(12) United States Patent
Watson et al.

(10) Patent No.: US 6,616,908 B2
(45) Date of Patent: Sep. 9, 2003

(54) TREATMENT OF A GAS STREAM CONTAINING HYDROGEN SULPHIDE

(75) Inventors: Richard William Watson, Near Ilkley (GB); Stephen Rhys Graville, Sheffield (GB)

(73) Assignee: The BOC Group plc, Windlesham (GB)

( * ) Notice: Subject to any disclaimer, the term of this patent is extended or adjusted under 35 U.S.C. 154(b) by 0 days.

(21) Appl. No.: 09/925,235

(22) Filed: Aug. 9, 2001

(65) Prior Publication Data
US 2002/0025292 A1 Feb. 28, 2002

(30) Foreign Application Priority Data
Aug. 31, 2000 (GB) .............................................. 0021409

(51) Int. Cl.[7] .............................................. C01B 17/04
(52) U.S. Cl. ................. 423/573.1; 423/228; 423/574.1; 423/576; 423/576.2; 423/576.8
(58) Field of Search ........................... 423/573.1, 574.1, 423/576, 576.2, 576.8, 228

(56) References Cited

U.S. PATENT DOCUMENTS

| | | | |
|---|---|---|---|
| 4,085,199 A | 4/1978 | Singleton et al. | 423/574 R |
| 4,124,685 A | 11/1978 | Tarhan et al. | 423/574 L |
| 4,919,912 A | 4/1990 | Taggart et al. | 423/574 R |
| 5,468,458 A | * 11/1995 | Watson | 423/222 |
| 6,403,051 B1 | * 6/2002 | Keller | 423/573.1 |
| 6,517,801 B2 | * 2/2003 | Watson et al. | 423/574.1 |

FOREIGN PATENT DOCUMENTS

| | | |
|---|---|---|
| EP | 0 565 316 A2 | 10/1993 |
| GB | 715 180 | 9/1954 |
| GB | 2 114 106 A | 8/1983 |
| WO | WO 97/26069 | 7/1997 |
| WO | WO 97/26070 | 7/1997 |

OTHER PUBLICATIONS

"Encyklopädie der technischen Chemie" 1982, Verlag Chemie GmbH, Weinheim, Germany XP002178704 21, pp. 8–26.

* cited by examiner

Primary Examiner—Stanley S. Silverman
Assistant Examiner—Timothy C. Vanoy
(74) Attorney, Agent, or Firm—Philip H. Von Neida

(57) ABSTRACT

Sour gas containing hydrogen sulphide has hydrogen sulphide absorbed therefrom in an absorbent in a vessel 4. A hydrogen sulphide rich gas stream is formed by desorbing hydrogen sulphide from the absorbent in a vessel 12. The resulting hydrogen sulphide rich gas stream is partially burned in a furnace 32. Resulting sulphur dioxide reacts therein with residual hydrogen sulphide to form sulphur vapor which is extracted in a condenser 44. Residual sulphur dioxide and sulphur vapor are reduced to hydrogen sulphide in catalyst stage 54 of a reactor 50. Water vapor is removed from the resulting reduced gas stream by direct contact with water in a quench tower 60. At least part of the resulting water vapor depleted gas stream is sent to the vessel 4 with the incoming sour gas stream.

6 Claims, 1 Drawing Sheet

TREATMENT OF A GAS STREAM CONTAINING HYDROGEN SULPHIDE

BACKGROUND ON THE INVENTION

This invention relates to the treatment of a gas stream comprising hydrogen sulphide.

Sour gas streams containing hydrogen sulphide are, for example, formed as by-products of gas and oil refining operation. Examples of sour gas streams containing hydrogen sulphide are products of natural gas wells, tail gas streams for such industrial sources as the hydrodesulphurisation or hydrotreating units of an oil refinery or a plant for synthesis gas manufacture.

The sour gas stream typically contains less than 40% by volume of hydrogen sulphide, sometimes less than 10% by volume. Other gaseous components of sour gas streams typically include carbon dioxide, ammonia, and hydrocarbons. Conventionally, such gas streams are first concentrated and then treated by the Claus process. The concentration step typically comprises absorbing hydrogen sulphide in an aqueous solution of a suitable amine, and then desorbing the hydrogen sulphide from the aqueous solution. Typically, the resulting gas stream comprises at least 40% by volume of hydrogen sulphide, and frequently more than 70%. The resulting gas stream also contains carbon dioxide, the relative proportions of hydrogen sulphide and carbon dioxide depending on the selectivity of the chosen amine absorbent for hydrogen sulphide. Such gas streams are often referred to as "acid gas streams".

Conventionally, such acid gas streams are treated by the Claus process. An acid gas stream may be mixed upstream of treatment by the Claus process with a so-called sour water stripper gas stream, typically comprising hydrogen sulphide, water vapour, and ammonia. The Claus process typically includes an initial thermal stage in which part of the hydrogen sulphide content of the gas stream is subjected to combustion to form sulphur dioxide and water vapour. The sulphur dioxide reacts in the combustion furnace with residual hydrogen sulphide to form sulphur vapour and water vapour. The reaction between sulphur dioxide and hydrogen sulphide does not proceed to completion in the furnace. Typically two or three further stages of reaction between hydrogen sulphide and sulphur dioxide are required to achieve, say 98%, conversion to sulphur of the incoming hydrogen sulphide. The reaction in these further stages is catalysed, with sulphur vapour being removed from the gas steam upstream of each catalytic stage. Claus plants are therefore large installations employing large beds of catalysts. Modern environmental standards typically necessitate the achievement of higher conversion efficiencies than 98%. In order to meet these standards, a large "tail gas clean up unit" is typically added to the Claus plant.

Some reductions in the size of a Claus plant can be achieved if the gas that is used to support the combustion of part of the hydrogen sulphide is oxygen-enriched air rather than atmospheric air (unenriched in oxygen).

EP-A-565 316 relates to a process which is operable to reduce or eliminate the requirements for catalyst of the reaction between hydrogen sulphide and sulphur dioxide. The concept underlying most examples of the process according to EP-A-565 316 is that by recycling hydrogen sulphide to the furnace, a high effective conversion of hydrogen sulphide to sulphur can be achieved therein, thereby limiting the amount of catalytic reaction of hydrogen sulphide and sulphur dioxide downstream of the furnace. In order to form the hydrogen sulphide recycle stream, the gas stream from the furnace, downstream of a condenser for extracting sulphur vapour, is subjected to catalytic hydrogenation so as to reduce back to hydrogen sulphide all the sulphur dioxide present. Most of the water vapour is condensed out or otherwise removed from the reduced gas stream and the resulting water vapour depleted reduced gas stream is divided into two parts, one part being returned to the furnace, and the other part being subjected to further treatment, typically in an associated Claus plant of conventional kind. In order to maintain adequate temperatures in the furnace, the source of oxygen molecules which are used to support combustion therein is a source of oxygen-enriched air containing at least 80 mole % of oxygen and more preferably a source of commercially pure oxygen.

The problem remains however of being able to extract substantially all the (chemically combined) sulphur in the feed gas without requiring treatment of purge gas in such an auxiliary Claus plant and without necessitating a recycle rate to the furnace which is several times the rate at which feed gas enters the furnace.

The invention provides a method and apparatus aimed at addressing this problem.

SUMMARY OF THE INVENTION

According to the present invention there is provided a method of treating a sour gas containing hydrogen sulphide, comprising the steps of:
a) selectively absorbing hydrogen sulphide from the sour gas and from a recycle gas in a selective absorbent of hydrogen sulphide;
b) generating a feed gas stream containing hydrogen sulphide by stripping absorbed gas from the selective absorbent;
c) burning in a furnace part of the hydrogen sulphide content of the feed gas stream so as to form sulphur dioxide and water vapour, supplying oxygen-enriched air or oxygen to the furnace to support combustion of the said part of the feed gas, and reacting in the furnace resulting sulphur dioxide with hydrogen sulphide so as to form as effluent gas stream containing sulphur vapour, water vapour, hydrogen sulphide, and sulphur dioxide;
d) extracting the sulphur vapour from the effluent gas stream so as to form a sulphur-depleted gas stream;
e) reducing to hydrogen sulphide essentially the entire content of sulphur dioxide and any sulphur vapour in the sulphur-depleted gas stream so as to form a reduced gas stream;
f) removing most of the water vapour from the reduced gas stream so as to form a water vapour depleted gas stream; and
g) returning at least part of the water vapour depleted gas stream to said step a) as the recycle gas.

The invention also provides apparatus for the treatment of a sour gas containing hydrogen sulphide, comprising:
a) an absorber vessel operable to receive a selective absorbent of hydrogen sulphide and to absorb therein hydrogen sulphide from the sour gas and from a recycle gas;
b) a desorber vessel operable to receive from the absorber vessel the selective absorbent charged with gas, and to form by stripping gas from the selective absorbent a feed gas stream containing hydrogen sulphide;
c) a furnace arranged to burn in the presence of oxygen or oxygen-enriched air part of the hydrogen sulphide content of the feed gas so as to form sulphur dioxide and water vapour, and to allow reaction to take place between hydrogen sulphide and sulphur dioxide to form sulphur vapour and water vapour, the furnace having an outlet for an effluent gas stream containing sulphur vapour, water vapour, hydrogen sulphide and sulphur dioxide;

d) means for extracting sulphur vapour from the effluent gas stream and thereby forming a sulphur-depleted gas stream;

e) a reactor for reducing to hydrogen sulphide essentially the entire content of sulphur dioxide and any sulphur vapour in the sulphur vapour depleted gas stream entering the reactor, and thereby forming a reduced gas stream;

f) means for extracting from the reduced gas stream most of its water vapour content and thereby forming a water vapour depleted gas stream; and g) a recycle gas passage leading from the water vapour extraction means to the absorber vessel.

By employing the same absorber to concentrate in hydrogen sulphide both the sour gas flow and a recycle gas flow the capital cost of the plant is kept down. A conventional Claus plant is typically located upstream of an initial gas treatment unit for concentrating the sour gas in hydrogen sulphide, and typically includes and a furnace with associated waste heat boiler and sulphur condenser for removing about two thirds of the incoming sulphur content of the hydrogen sulphide in the sour gas, a plurality of catalytic Claus stages for removing most of the residual sulphur content, and a tail gas clean up unit for extracting from the effluent gas that exits the most downstream of the catalytic Claus stages. In comparison, the method and apparatus omits the tail gas clean up unit and the catalytic Claus stages, employing only the reduction stage (which may as will be described below include a bed of Claus catalyst) and a water removal stage in their stead.

The absorbent of hydrogen sulphide is preferably an aqueous solution of an amine adapted for the selective separation of hydrogen sulphide from carbon dioxide. Such amines are well known in the art and generally contain substituents which sterically hinder the absorption of carbon dioxide. A particularly preferred absorbent is methyldiethanolamine (MDEA). Other suitable selective absorbents of hydrogen sulphide are disclosed in U.S. Pat. No. 4,919,912.

The non-absorbed gas typically forms a purge gas from the process and is typically sent to an incinerator so that its last traces of hydrogen sulphide can be converted to sulphur dioxide. The incinerator typically has a stack through which its combustion products can be vented to the atmosphere.

Although water vapour can be extracted from the reduced gas stream in the absorber vessel itself it is generally preferred to remove water vapour therefrom separately in a discrete vessel intermediate the reduction step and the recycle hydrogen sulphide absorption step.

Preferably, another part of the water vapour depleted gas stream may be returned as an additional recycle stream to the furnace, by-passing the absorption of the hydrogen sulphide. The additional recycle enhances the flexibility of the method according to the invention in handling sour gas streams of different hydrogen sulphide concentrations or of varying compositions.

If desired, between the said steps d) and e) the sulphur depleted gas stream may be subjected to a step of catalytic reaction between sulphur dioxide and hydrogen sulphide therein. If this additional step is performed the apparatus according to the invention additionally includes intermediate the sulphur extraction means and the reactor a bed of catalyst selected to catalyse reaction between sulphur dioxide and hydrogen sulphide in the sulphur-depleted gas stream. Such a catalytic reaction step helps to protect the reduction stage from any surge in the concentration of sulphur dioxide.

Preferably the catalytic reaction between hydrogen sulphide and sulphur dioxide is performed at temperatures above the dew point of sulphur, for example in the range of 160° C. to 400° C., and particularly 160° C. to 300° C.

Preferably all the sulphur formed in the catalytic reaction between hydrogen sulphide and sulphur dioxide is allowed to pass into the reduction reactor rather than being extracted from the sulphur-depleted gas stream.

Preferably the mole ratio of hydrogen sulphide to sulphur dioxide in the sulphur-depleted gas stream at the end of step d) is normally at least 4 to 1 and may be as high as 8.5 to 1 or higher. At such high ratios, the sulphur dioxide concentration in the gas stream leaving the sulphur vapour extraction stage can be kept in the order of 1% during normal operation. Accordingly, only a relatively small amount of reduction is required having regard to the hydrogen sulphide content of the feed gas.

The reduction step of the method according to the present invention is preferably performed catalytically at temperatures in the range of 250° C. to 400° C. The reductant is preferably hydrogen. Typically, the sulphur-depleted gas mixture contains sufficient hydrogen (by virtue of thermal cracking of hydrogen sulphide in the furnace) to reduce all the reducible sulphur species present including sulphur vapour as well as the sulphur dioxide. If needed, however, hydrogen can be supplied from an auxiliary hydrogen generator.

Preferably the same vessel houses the catalyst of the reaction between hydrogen sulphide and sulphur dioxide and the catalyst of the said reduction reaction.

If desired, sour water stripper gas may be premixed with the feed gas upstream of the furnace or supplied separately to the furnace. All the sour water stripper gas is desirably fed to the hottest region of the furnace so as to ensure complete destruction of ammonia.

The sulphur vapour is preferably extracted from the effluent gas stream by condensation.

The water vapour is preferably extracted from the reduced gas stream by direct contact condensation.

If desired, further formation of sulphur vapour may take place intermediate steps (d) and (e) of the method according to the invention.

BRIEF DESCRIPTION OF THE DRAWINGS

The method and apparatus according to the invention will now be described by way of example with reference to the accompanying drawing, in which.

DETAILED DESCRIPTION OF THE INVENTION

Figure 1:
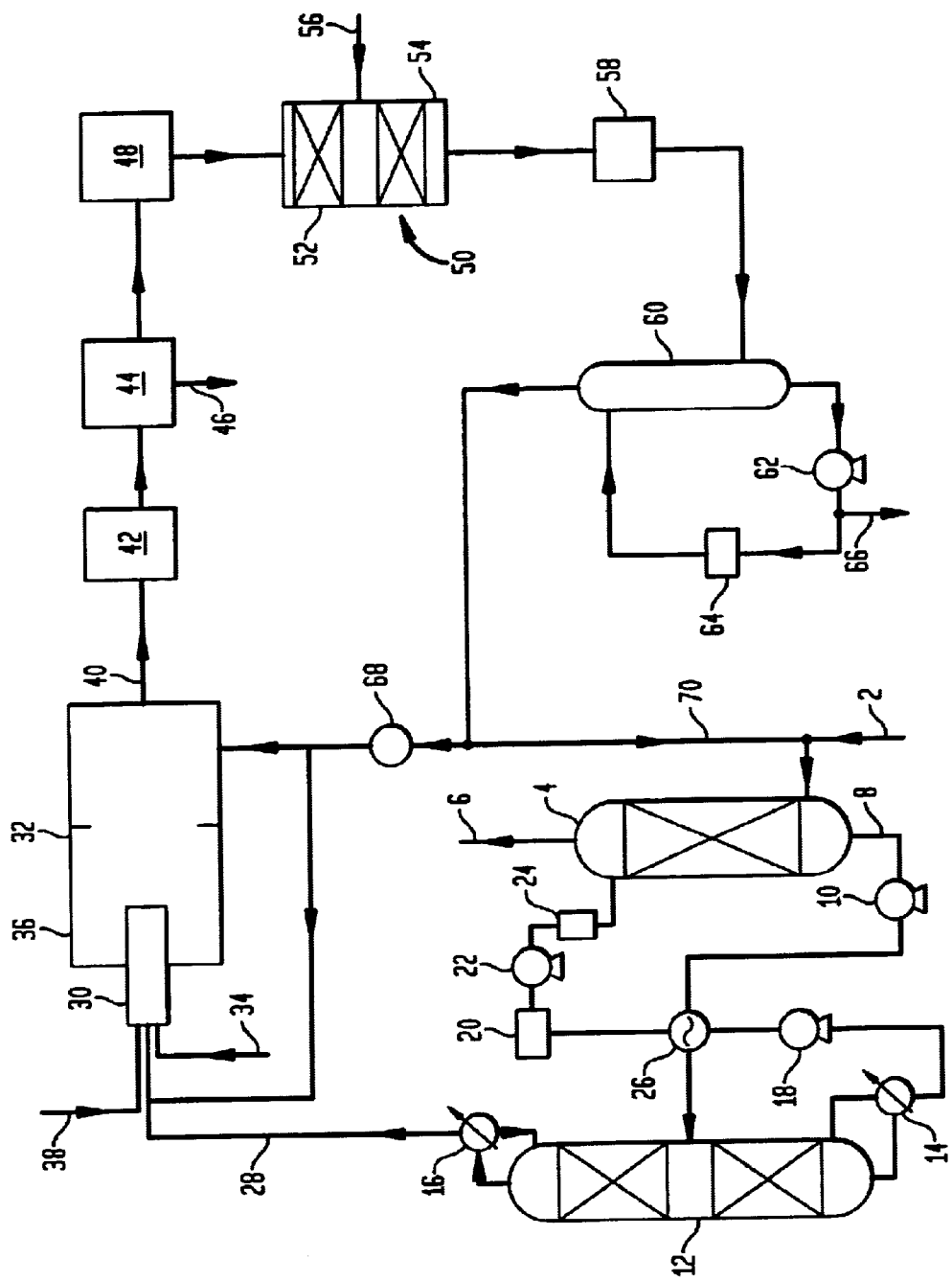
FIG. 1 is a schematic flow diagram of a first plant for recovering sulphur from a gas stream containing hydrogen sulphide.

Referring to FIG. 1 of the drawing, a sour gas steam typically containing up to 35% by volume of hydrogen sulphide is received in a pipeline 2. The sour water gas stream typically contains carbon dioxide, ammonia, and hydrocarbons. The sour water stream is typically at a temperature in the range of 80° C. to 90° C. and a pressure in the range of 1 bar to 2 bar, preferably 1 bar (absolute) to 1.5 bar (absolute). The sour water gas stream is mixed with a recycle gas stream supplied through a pipeline 70 and flows into an absorber vessel 4 in the form of a column. In the absorber vessel 4 the sour water gas stream flows upwardly and comes into contact with a descending stream of absorbent, typically an aqueous solution of methyldiethanolamine. The absorber vessel 4 contains liquid vapour contact means, typically a random or structured packing, so as to facilitate mass exchange between the ascending gas and the descending liquid. As the gas ascends the vessel 4, so it becomes progressively leaner in hydrogen sulphide, whereas as the liquid descends the vessel 4 it becomes progressively richer in hydrogen sulphide. The hydrogen sulphide depleted gas leaves the top of the absorption vessel 4 through an outlet 6 as a purge gas and typically contains of the order of 0.1% by volume of hydrogen sulphide. The purge gas is typically sent to an incinerator (not shown) so as to convert to sulphur dioxide its residual hydrogen sulphide content. The gas from the incinerator is typically vented to the atmosphere through a stack (not shown).

Some carbon dioxide will be absorbed by the descending liquid in the column 4 in addition to the hydrogen sulphide. The amount of carbon dioxide that is so absorbed will depend on the selectivity of the absorbent (the more selective the adsorbent, the less the amount of carbon dioxide absorbed) and the partial pressure of carbon dioxide in the sour gas stream. In general, it may be desirable to choose a highly selective absorbent of hydrogen sulphide.

Liquid absorbent charged with hydrogen sulphide passes out of the absorber vessel 4 through an outlet 8 at its bottom and is urged by means of a pump 10 into an upper region of a desorber or stripper vessel 12. The desorber vessel 12, which is operated at a higher pressure than the absorber vessel 4, has a reboiler 14 associated with it. The reboiler 14 takes the form of an indirect heat exchanger in which liquid at the bottom of the vessel 12 is boiled by indirect heat exchange with steam. A vapour flow up the vessel 12 is thus created with the result that hydrogen sulphide and carbon dioxide are stripped from descending liquid. The desorber vessel 12 is provided with liquid vapour contact devices, typically in the form of random or structured packing, so as to facilitate mass transfer between the descending liquid and the ascending vapour. A hydrogen sulphide rich gas stream leaving the top of the desorber vessel 12 is preferably passed through a condenser 16 in which it is cooled by indirect heat exchange with water. Water vapour and any vaporous absorbent are condensed and are typically returned to the top of the desorber vessel 12. Liquid absorbent essentially free of hydrogen sulphide passes to the bottom of the desorber vessel 12. A stream of liquid absorbent essentially free of hydrogen sulphide is withdrawn from the bottom of the vessel 12 by operation of a pump 18, is cooled by passage through a heat exchanger 26, and is collected in a storage vessel 20. The heat exchanger 26 is employed to pre-heat the feed to the stripper column 12. The thus cooled hydrogen sulphide-free absorbent is collected in a storage vessel 20 which is employed as the source of absorbent for the absorber vessel 4. Absorbent is conveyed from the storage vessel 20 to the top of the vessel 4 by means of a pump 22 via a cooler 24.

The hydrogen sulphide rich gas typically leaves the condenser 16 at a temperature in the range of 40° C. to 50° C. and flows along a pipeline 28; without being reheated, to a burner 30 that fires into a Claus furnace 32. This hydrogen sulphide rich gas contains some hydrogen sulphide which has already passed through the furnace 32, ie it includes recycle gas. A sour water stripper gas stream is supplied along a pipeline 34 to the burner 30 separately from the hydrogen sulphide rich gas. Alternatively, the two gas streams may be pre-mixed. The sour water stripper gas stream typically contains ammonia, hydrogen sulphide, and water vapour as its main components.

The burner 30 typically fires into the furnace 32 typically through one end wall 36 thereof (as shown) or through a sidewall at a position close to the end wall 36, typically at right angles to the axis of the furnace 32. The burner 30 is supplied separately from a pipeline 38 with a stream of commercially pure oxygen or a stream of air highly enriched in oxygen. In either case, the mole fraction of oxygen in the gas that is supplied along the pipeline 38 is preferably at least 0.8. Indeed, the oxygen stream typically contains at least 90% by volume of oxygen and may be separated from air by, for example, pressure swing adsorption or by fractional distillation, the latter separation method being able to produce oxygen at a purity in excess of 99%.

By means of the burner 30 a part of the hydrogen sulphide content of the gas entering it is burned in the furnace 32. The rate of flow of oxygen or oxygen-enriched air along the pipeline 38 relative to the rate of flow of hydrogen sulphide containing gas along the pipelines 28 and 34 is such that any hydrocarbon is completely oxidised, whereas only a part of the incoming hydrogen sulphide is oxidised. In addition any ammonia present is desirably completely destroyed. Thus, several chemical reactions take place in the furnace 32. Firstly, there are combustion reactions in which any hydrocarbon is completely oxidised to carbon dioxide and water vapour. Ammonia present is oxidised to nitrogen and water vapour. Care is normally taken to ensure that there is an adequate temperature (preferably at least 1300° C.) to effect the oxidation of ammonia.

The main combustion reaction is, however, the burning of hydrogen sulphide to form water vapour and sulphur dioxide. Part of the resultant sulphur dioxide reacts in the furnace 32 with residual hydrogen sulphide to form sulphur vapour and further water vapour.

Another important reaction that takes place in the flame zone of the furnace 32 is the thermal dissociation of a part of the hydrogen sulphide into hydrogen and sulphur vapour. In addition, if ammonia is present, some thermal dissociation of it into hydrogen and nitrogen will take place. Employing a combustion supporting gas rich in oxygen facilitates thermal dissociation (also known as thermal cracking) of hydrogen sulphide and ammonia. Various other reactions may also take place in the furnace 32 such as the formation of carbon monoxide, carbon oxysulphide and carbon disulphide.

In general, it is preferred to employ a high flame temperature (e.g. in the range of 1250° C. to 1650° C.) so as to favour the reaction between hydrogen sulphide and sulphur dioxide and also to favour thermal dissociation of hydrogen sulphide and ammonia. Typically, recycle of gases to the furnace 32 has the effect of keeping the flame temperature to the lower temperatures in the above range. In operating the burner 30 and the furnace 32, care should of course be taken to avoid damage to the furnace lining. The angle and position of entry of the burner 30 into the furnace 32 and the flame configuration are chosen so as to avoid such damage. The thermal dissociation of hydrogen sulphide has a cooling effect which can be taken into account in selecting the position and angle of entry of the burner 30.

The furnace 32 is operated at a pressure in the range of 1 bar (absolute) to 2 bar (absolute), preferably 1.5 bar to 1.2 bar.

As a result of the reactions that take place in the furnace 32, an effluent gas stream typically comprising hydrogen sulphide, sulphur dioxide, water vapour, sulphur vapour, hydrogen, carbon dioxide, carbon monoxide, argon, nitrogen and traces of carbon oxysulphide leaves the furnace 32 through an outlet 40, typically at a temperature greater than 900° C. At such temperatures, some of the components of the effluent gas stream are still reacting with one another so it is difficult to specify the precise composition of the gas mixture in the outlet 40. The gas stream passes from the outlet 40 directly into a waste heat boiler 42 or other form of heat exchanger in which it is cooled to a temperature in the range of 250° C. to 400° C. During the passage of the gas stream through the waste heat boiler 42, there is a tendency for some of the hydrogen to reassociate with sulphur to form hydrogen sulphide.

The cooled effluent gas stream passes from the waste heat boiler 42 to a sulphur condenser 44 in which it is further cooled to a temperature in the range of 120° C. to 160° C. and in which the sulphur vapour is condensed and is extracted via an outlet 46. The resulting liquid sulphur is typically passed to a sulphur seal pit (not shown). The resulting sulphur vapour-depleted gas stream (now typically containing only traces of sulphur vapour) is heated downstream of the condenser 44 to a temperature in the range of 250° C. to 350° C., typically about 300° C., for example, by indirect heat exchange with superheated steam, or a hot gas, in a reheater 48.

The thus reheated sulphur vapour depleted gas stream flows into the first stage 52 of a two stage catalytic reactor 50. The first stage comprises at least one conventional catalyst of the Claus reaction, that is the reaction between hydrogen sulphide and sulphur dioxide to form sulphur vapour and water vapour. Typically, the conventional catalyst is activated alumina, titanium dioxide or bauxite, in the first stage 52, most of the sulphur dioxide content of the sulphur vapour depleted gas stream reacts with hydrogen sulphide to form sulphur vapour and water vapour.

The resulting gas mixture flows into the second stage 54 of the two stage catalytic reactor 50, which in one example of the method according to the invention includes a catalyst of cobalt-molybdenum oxides that catalyses reduction by hydrogen to hydrogen sulphide of sulphur vapour and residual sulphur dioxide. A number of other reactions can take place in the second stage of the reactor 50. In particular, any carbon monoxide present reacts with water vapour to form hydrogen and carbon dioxide. Further, at least 90% but not all of any carbon oxysulphide present in the sulphur vapour depleted gas stream is hydrolysed in the catalytic reactor to carbon dioxide and hydrogen sulphide. Similarly, any carbon disulphide present in the sulphur vapour depleted gas stream is also hydrolysed to carbon dioxide and hydrogen sulphide.

In another alternative, the sulphur vapour depleted gas stream is reheated to a temperature lower than 250° C., say in the range of 165° C. to 200° C., upstream of the reactor 50, and is reheated again to a temperature in the range of 250° C. to 400° C. (say, 300° C.) intermediate the stages 52 and 54.

At least some of the hydrogen necessary for the reduction reactions that take place in the second stage 54 of the reactor 50 is present in the sulphur vapour depleted gas stream itself. Accordingly, there is often no need to add the necessary hydrogen reductant from an external source. It is preferred, nonetheless, to have available a pipeline 56 for the addition of external hydrogen at a rate sufficient to cause the complete reduction to hydrogen sulphide of all the sulphur and sulphur dioxide present. The external hydrogen may be generated on site, by, for example, partial oxidation of hydrocarbon, preferably using pure oxygen or oxygen-enriched air as the oxidant.

If desired, the second stage 54 of the reactor 50 may be provided with a cooling coil through which a coolant (eg steam) may be passed in the event of there being an excessive generation of heat in the catalyst therein.

A resulting reduced gas stream, now consisting essentially of hydrogen sulphide, water vapour, carbon dioxide, nitrogen and argon, leaves the reactor 50 and flows through a heat exchanger 58 in which it is cooled to a temperature in the range of 100° C. to 200° C. by indirect heat exchange with water and/or steam.

The reduced gas stream is introduced into a desuperheating, direct contact, quench tower 60. In the quench tower 60, the gas stream flows upwardly and comes into contact with a descending stream of water. The reduced gas stream is thus cooled and a large proportion (typically in excess of 85%) of its water vapour content condensed, the condensate entering the descending liquid stream. The quench tower 60 preferably contains a random or structured packing (not shown) so as to facilitate mass transfer between the ascending vapour and descending liquid. As a result, a water vapour-depleted gas stream is formed. The water exiting the bottom of the quench tower 60 is recirculated by means of a pump 62 and cooled in a cooler 64 upstream of being reintroduced into the top of the quench tower 60. Excess water is removed through an outlet 66 and sent to a sour water stripper (not shown).

The water vapour depleted gas stream is divided into two subsidiary streams. One subsidiary stream is returned to the furnace 32 as a recycle stream. The recycle stream is preferably not reheated, but a fan 68 is typically employed to effect its flow back to the furnace 32. Alternatively an ejector or eductor in which steam is mixed with the sas may be employed upstream of the quench tower 60. Most of the added steam is, of course, condensed in the quench tower 60. If desired, some or all of the recycle stream may be returned to a downstream region of the furnace 32. Alternatively or in addition, some or all of the recycle stream may be mixed with the hydrogen sulphide rich gas stream in the pipeline upstream of the burner 30.

The other subsidiary gas stream is sent to the pipeline 70 for recycle to the absorber 4.

The size of the other subsidiary gas stream is arranged such that build-up of nitrogen, argon and carbon dioxide in the plant shown in FIG. 1 of the drawings is avoided by virtue of venting of the purge gas through the outlet 6 of the absorber vessel 4.

The apparatus shown in FIG. 1 is able to cope well with a sudden increase in the sulphur dioxide concentration of the sulphur vapour depleted gas stream leaving the sulphur condenser 44.

This is because the first stage 52 of the reactor 50 "dampens" variations in the concentration of sulphur dioxide at the inlet to the second stage. Further, the presence of the first stage 52 acts during normal operation to reduce the sulphur dioxide concentration to less than one third of the value it would be were the first stage to be omitted. Even in the event of a sudden peak in the sulphur dioxide concentration it is expected that sufficient hydrogen would be present in the gas stream to complete the reduction in the reactor 50. Temperature or concentration monitoring can be used to initiate a supply of hydrogen through the pipeline 56 if, however, the hydrogen formed in the furnace 32 by thermal cracking of the hydrogen sulphide becomes inadequate to effect complete reduction of all the reducible sulphur species in the reactor 50. Similarly, temperature monitoring can be used to initiate or modulate a supply of coolant (typically, steam) to the second stage 54 in the event of the extent of the reduction reactions in the second stage 54 creating too large an exotherm in the catalyst bed therein.

Various changes and modifications may be made to the apparatus shown in the drawings. For example, the first stage 52 of catalyst can be omitted from the reactor 50 with the result that no reaction between hydrogen sulphide and sulphur dioxide takes place therein.

What is claimed is:

1. A method of treating a sour gas containing hydrogen sulphide, comprising the steps of:

a) selectively absorbing hydrogen sulphide from the sour gas and from a recycle gas in a selective absorbent of hydrogen sulphide;

b) generating a feed gas stream containing hydrogen sulphide by stripping absorbed gas from the selective absorbent;

c) burning in a furnace part of the hydrogen sulphide content of the feed gas stream so as to form sulphur dioxide and water vapour, supplying oxygen-enriched air or oxygen to the furnace to support combustion of the-said part of the feed gas, and reacting in the furnace resulting sulphur dioxide with hydrogen sulphide so as to form an effluent gas stream containing sulphur vapour, water vapour, hydrogen sulphide, and sulphur dioxide;

d) extracting the sulphur vapour from the effluent gas stream so as to form a sulphur-depleted gas stream and subjecting said sulphur-depleted gas stream to a catalytic reaction between sulphur dioxide and hydrogen sulphide to form sulphur;

e) reducing to hydrogen sulphide essentially the entire content of sulphur dioxide and sulphur vapour in the sulphur-depleted gas stream so as to form a reduced gas stream wherein said sulphur from said step (d) is allowed to pass to step (e);

f) removing most of the water vapour from the reduced gas stream so as to form a water vapour depleted gas stream; and g) returning at least part of the water vapour depleted gas stream to said step (a) as the recycle gas.

2. The method of claim 1, wherein the reduction step is performed catalytically at temperatures in the range of 250° C. to 400° C.

3. The method of claim 1, in which water vapour is removed from the reduced gas stream separately from the absorption of hydrogen sulphide.

4. The method of claim 1, in which another part of the water vapour depleted gas stream is recycled to the furnace, by-passing the absorption of the hydrogen sulphide.

5. The method of claim 1, in which sour water stripper gas is premixed with the feed gas upstream of the furnace.

6. The method of claim 1, in which sour water stripper gas is supplied separately from the feed gas to the furnace.

* * * * *